(12) United States Patent
Huggins

(10) Patent No.: US 12,469,915 B2
(45) Date of Patent: Nov. 11, 2025

(54) BATTERY PACK SUPPORT PORTION CONFIGURED TO ACCOMMODATE MULTIPLE DIFFERENT DEVICE INTERFACES

(71) Applicant: TECHTRONIC CORDLESS GP, Anderson, SC (US)

(72) Inventor: Mark Huggins, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 7 days.

(21) Appl. No.: 18/409,455

(22) Filed: Jan. 10, 2024

(65) Prior Publication Data
US 2024/0145833 A1    May 2, 2024

Related U.S. Application Data

(63) Continuation of application No. 17/820,506, filed on Aug. 17, 2022, now Pat. No. 11,916,245, which is a
(Continued)

(51) Int. Cl.
*H01M 50/213* (2021.01)
*B25F 5/02* (2006.01)
(Continued)

(52) U.S. Cl.
CPC ............. *H01M 50/213* (2021.01); *B25F 5/02* (2013.01); *H01M 10/058* (2013.01);
(Continued)

(58) Field of Classification Search
CPC ............. H01M 50/213; H01M 10/058; H01M 10/4207; H01M 10/488; H01M 50/296;
(Continued)

(56) References Cited

U.S. PATENT DOCUMENTS

| | | |
|---|---|---|
| 5,438,173 A | 8/1995 | Rudoy et al. |
| 5,709,964 A | 1/1998 | Christensen et al. |
| | (Continued) | |

FOREIGN PATENT DOCUMENTS

| | | |
|---|---|---|
| CN | 1322395 A | 11/2001 |
| CN | 2479648 Y | 2/2002 |
| | (Continued) | |

OTHER PUBLICATIONS

Extended European Search Report for Application No. 20190334.1 dated Dec. 14, 2020 (7 pages).
(Continued)

*Primary Examiner* — M Baye Diao
(74) *Attorney, Agent, or Firm* — Michael Best & Friedrich LLP

(57) ABSTRACT

A system may include a first device including a first electrical interface and a second device including a second electrical interface. The system may include a battery pack including a battery pack support portion. The system may include a first removable battery pack interface configured to electrically and mechanically connect to the battery pack support portion, the first removable battery pack interface further configured to electrically connect to the first electrical interface of the first device. The system may include a second removable battery pack interface configured to electrically and mechanically connect to the battery pack support portion, the second removable battery pack interface further configured to electrically connect to the second electrical interface of the second device.

20 Claims, 15 Drawing Sheets

Related U.S. Application Data continuation of application No. 16/536,427, filed on Aug. 9, 2019, now Pat. No. 11,424,504.

(51) Int. Cl.

| | | |
|---|---|---|
| *H01M 10/058* | (2010.01) | |
| *H01M 10/42* | (2006.01) | |
| *H01M 10/48* | (2006.01) | |
| *H01M 50/296* | (2021.01) | |
| *H01M 50/543* | (2021.01) | |
| *H01M 50/572* | (2021.01) | |
| *H02J 7/00* | (2006.01) | |

(52) U.S. Cl.
CPC ..... *H01M 10/4207* (2013.01); *H01M 10/488* (2013.01); *H01M 50/296* (2021.01); *H01M 50/543* (2021.01); *H01M 50/572* (2021.01); *H02J 7/0044* (2013.01); *H01M 2220/30* (2013.01)

(58) Field of Classification Search
CPC ............. H01M 50/543; H01M 50/572; H01M 2220/30; H01M 10/0587; H01M 10/0525; B25F 5/02; H02J 7/0044; Y02E 60/10; Y02P 70/50
USPC .......................................................... 320/112
See application file for complete search history.

(56) References Cited

U.S. PATENT DOCUMENTS

| | | | |
|---|---|---|---|
| 5,929,597 A | 7/1999 | Pfeifer et al. | |
| 5,945,806 A | 8/1999 | Faulk | |
| 6,087,815 A | 7/2000 | Pfeifer et al. | |
| 7,377,805 B2 | 5/2008 | Kim et al. | |
| 7,453,234 B2 | 11/2008 | Phillips et al. | |
| 7,550,213 B2 | 6/2009 | Wheeler et al. | |
| 7,701,084 B2 | 4/2010 | Youn et al. | |
| 7,719,230 B2 | 5/2010 | Griffin | |
| 7,775,438 B2 * | 8/2010 | Beckhusen ........... G06F 1/1684 | |
| | | | 235/462.49 |
| 8,210,273 B2 | 7/2012 | Suzuki et al. | |
| 8,330,426 B2 | 12/2012 | Suzuki et al. | |
| 8,384,349 B2 | 2/2013 | Suzuki et al. | |
| 8,653,790 B2 | 2/2014 | Johnson et al. | |
| 8,742,724 B2 | 6/2014 | Suzuki et al. | |
| 8,816,613 B2 | 8/2014 | Lee | |
| 8,957,610 B2 | 2/2015 | Lee | |
| 9,077,053 B2 | 7/2015 | Schneider et al. | |
| 9,224,994 B2 | 12/2015 | Ota et al. | |
| 9,532,398 B2 * | 12/2016 | Mar ...................... H04W 52/36 | |
| 9,871,484 B2 * | 1/2018 | White ................. H01M 50/296 | |
| 10,148,111 B2 | 12/2018 | Reed | |
| 10,439,415 B2 | 10/2019 | Zhu et al. | |
| 10,749,430 B2 | 8/2020 | Gao et al. | |
| 10,950,830 B2 | 3/2021 | Fauteux et al. | |
| 10,985,552 B2 | 4/2021 | Tada et al. | |
| 11,251,508 B2 | 2/2022 | Brozek et al. | |
| 2010/0088843 A1 * | 4/2010 | Reed ..................... A47L 9/2873 | |
| | | | 320/112 |
| 2011/0250484 A1 | 10/2011 | Meng | |
| 2012/0045667 A1 | 2/2012 | Yoneda et al. | |
| 2013/0244504 A1 | 9/2013 | Ogura | |
| 2016/0204475 A1 * | 7/2016 | White ................. H01M 50/247 | |
| | | | 429/97 |
| 2016/0241065 A1 | 8/2016 | Kondo et al. | |
| 2017/0072553 A1 | 3/2017 | Bakker | |
| 2017/0170671 A1 | 6/2017 | Mergener et al. | |
| 2017/0222454 A1 | 8/2017 | Bakker | |
| 2018/0108896 A1 * | 4/2018 | Fees ..................... H01M 50/502 | |
| 2018/0277801 A1 | 9/2018 | Brozek et al. | |
| 2019/0237715 A1 * | 8/2019 | Seman, Jr. ............ H02J 7/0068 | |
| 2020/0287176 A1 | 9/2020 | Lu | |

FOREIGN PATENT DOCUMENTS

| | | |
|---|---|---|
| CN | 2572568 Y | 9/2003 |
| CN | 2779704 Y | 5/2006 |
| CN | 201174405 Y | 12/2008 |
| CN | 201975477 U | 9/2011 |
| CN | 202025827 U | 11/2011 |
| CN | 102916477 A | 2/2013 |
| CN | 202798098 U | 3/2013 |
| CN | 103119779 A | 5/2013 |
| CN | 203086179 U | 7/2013 |
| CN | 104064720 A | 9/2014 |
| CN | 204102977 U | 1/2015 |
| CN | 104901354 A | 9/2015 |
| CN | 105576756 A | 5/2016 |
| CN | 107294489 A | 10/2017 |
| CN | 107302248 A | 10/2017 |
| CN | 107342612 A | 11/2017 |
| CN | 207021730 U | 2/2018 |
| CN | 107910490 A | 4/2018 |
| CN | 207651616 U | 7/2018 |
| CN | 108791120 A | 11/2018 |
| CN | 109038711 A | 12/2018 |
| CN | 109301145 A | 2/2019 |
| GB | 2416252 B | 3/2007 |
| GB | 2545700 A | 6/2017 |
| TW | 420388 U | 1/2001 |
| TW | 1578661 B | 4/2017 |
| WO | 2018079722 A1 | 5/2018 |
| WO | 2018079724 A1 | 5/2018 |
| WO | 2018109488 A1 | 6/2018 |
| WO | 2018119256 A1 | 6/2018 |

OTHER PUBLICATIONS

Mexican Patent Office Action for Application No. MX/a/2020/008331 dated Sep. 20, 2023 (5 pages including statement of relevance).

Canadian Patent Office Action for Application No. 3,089,435 dated Feb. 20, 2024 (5 pages).

Canadian Patent Office Action for Application No. 3,089,435 dated Jul. 2, 2025 (5 pages).

\* cited by examiner

BATTERY PACK SUPPORT PORTION CONFIGURED TO ACCOMMODATE MULTIPLE DIFFERENT DEVICE INTERFACES

RELATED APPLICATIONS

This application is a continuation application of, and claims priority to, U.S. patent application Ser. No. 17/820,506, filed Aug. 17, 2022, which claim priority to, U.S. patent application Ser. No. 16/536,427, filed Aug. 9, 2019, the entire content of which is hereby incorporated by reference.

FIELD

Embodiments described herein relate to a battery pack for powering a device.

SUMMARY

In some aspects, the techniques described herein relate to a system of battery pack powered devices, the system including: a first device including a first electrical interface; a second device including a second electrical interface; a battery pack including a battery pack support portion; a first removable battery pack interface configured to electrically and mechanically connect to the battery pack support portion, the first removable battery pack interface further configured to electrically connect to the first electrical interface of the first device; and a second removable battery pack interface configured to electrically and mechanically connect to the battery pack support portion, the second removable battery pack interface further configured to electrically connect to the second electrical interface of the second device.

In some aspects, the techniques described herein relate to a system, wherein the battery pack further includes an interface body, the interface body having a first removable lateral portion and a second removable lateral portion, wherein the interface body is configured to be operable in a first terminal configuration and a second terminal configuration, wherein the first terminal configuration requires the first removable lateral portion and the second removable lateral portion, and wherein the second terminal configuration does not require the first removable lateral portion and the second removable lateral portion.

In some aspects, the techniques described herein relate to a system, wherein the first removable battery pack interface further includes a first plurality of terminals, wherein the second removable battery pack interface further includes a second plurality of terminals, and wherein the first plurality of terminals includes a greater number of terminals than the second plurality of terminals.

In some aspects, the techniques described herein relate to a system, wherein the first removable battery pack interface includes an interface body length that is approximately equal to a battery pack support portion length.

In some aspects, the techniques described herein relate to a system, the battery pack support portion further including a central recess, the central recess including a central recess length, wherein the first removable battery pack interface includes a central portion including a central portion length, and wherein the central portion length is approximately equal to the central recess length.

In some aspects, the techniques described herein relate to a system, wherein the first device is a battery charger.

In some aspects, the techniques described herein relate to a system, wherein the second device is a low power device that includes communication capability.

In some aspects, the techniques described herein relate to a system, wherein the second device is a low power device that does not include communication capability.

In some aspects, the techniques described herein relate to a system, wherein a shape of a body portion of the first removable battery pack interface and a shape of a body portion of the second removable battery pack interface are approximately equal in shape.

In some aspects, the techniques described herein relate to a system, wherein the battery pack support portion length is between approximately 43 mm and approximately 46 mm.

In some aspects, the techniques described herein relate to a system, wherein the battery pack support portion length is 44.48 mm.

In some aspects, the techniques described herein relate to a system, wherein the central recess length is between approximately 17 mm and 20 mm.

In some aspects, the techniques described herein relate to a system, wherein the central recess length is 18.75 mm.

In some aspects, the techniques described herein relate to a system of battery pack powered devices, the system including: a first device including a first electrical interface; a second device including a second electrical interface; a battery pack including a battery pack support portion; a removable battery pack interface configured to electrically and mechanically connect to the battery pack support portion, the removable battery pack interface including: a first terminal configured to electrically connect the battery pack to the first electrical interface of the first device; a second terminal configured to electrically connect the battery pack to the second electrical interface of the second device; and a third terminal configured as a bypass terminal configured to bypass a current sensing circuit; wherein, in response to connecting the removable battery pack interface to the first electrical interface, the removable battery pack interface is configured to electrically connect the first terminal to the first electrical interface and not connect the second terminal to the first device; and wherein, in response to connecting the removable battery pack interface to the second electrical interface, the removable battery pack interface is configured to electrically connect the second terminal to the second electrical interface and not connect the first terminal.

In some aspects, the techniques described herein relate to a system, wherein the removable battery pack interface further includes a first configuration of a plurality of terminals and a second configuration of the plurality of terminals, and wherein the first configuration of the plurality of terminals includes a greater number of terminals than the second configuration of the plurality of terminals.

In some aspects, the techniques described herein relate to a system, the battery pack support portion further including a central recess, the central recess including a central recess length, wherein the removable battery pack interface includes a central portion including a central portion length, and wherein the central portion length and the central portion length are both between approximately 17 mm and 20 mm.

In some aspects, the techniques described herein relate to a system, wherein a shape of a body portion of the removable battery pack interface and a shape of a body portion of the battery pack support portion are approximately equal in shape.

In some aspects, the techniques described herein relate to a system, wherein shape body portion of the removable battery pack interface is configured to mechanically secure the removable battery pack interface to the battery pack support portion in the absence of any of the first terminal, the second terminal, or the third terminal.

In some aspects, the techniques described herein relate to an interface configured to electrically and mechanically connect to a battery pack, the interface including: a first terminal configured to electrically connect the battery pack to a first electrical interface of a first device; a second terminal configured to electrically connect the battery pack to a second electrical interface of a second device; and a third terminal configured as a bypass terminal configured to bypass a current sensing circuit; wherein response to mechanically connecting to the first device, electrically connecting the first terminal and the third terminal of the interface to the battery pack, and wherein response to mechanically connecting to the second device, electrically connecting the second terminal and the third terminal of the interface to the battery pack.

In some aspects, the techniques described herein relate to an interface, the interface further including: a fourth terminal configured to electrically connect the battery pack to the first electrical interface of the first device and to the second electrical interface of the second device, wherein the fourth terminal includes an electric polarity that is opposite than an electric polarity of the first terminal, wherein response to mechanically connecting to the first device, electrically connecting the first terminal and the third terminal and the fourth terminal of the interface to the battery pack, and wherein response to mechanically connecting to the second device, electrically connecting the second terminal and the third terminal and the fourth terminal of the interface to the battery pack.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein provide a battery pack that includes a battery pack housing. The battery pack housing includes a battery pack support portion that is configured to removably mechanically and electrically connect the battery pack to a device. The support portion includes a plurality of terminals for electrically connecting the battery pack to the device, and first and second rails for mechanically connecting the battery pack to the device. The battery pack support portion includes a central recess. The battery pack support portion has a support portion length and a central recess length. The battery pack support portion is configured to receive a first device interface that electrically connects to a first subset of the plurality of terminals and is approximately the same length as the support portion length. The battery pack support portion is also configured to receive a second device interface that electrically connects to a second subset of the plurality of terminals and is approximately the same length as the central recess length.

Figure 1:
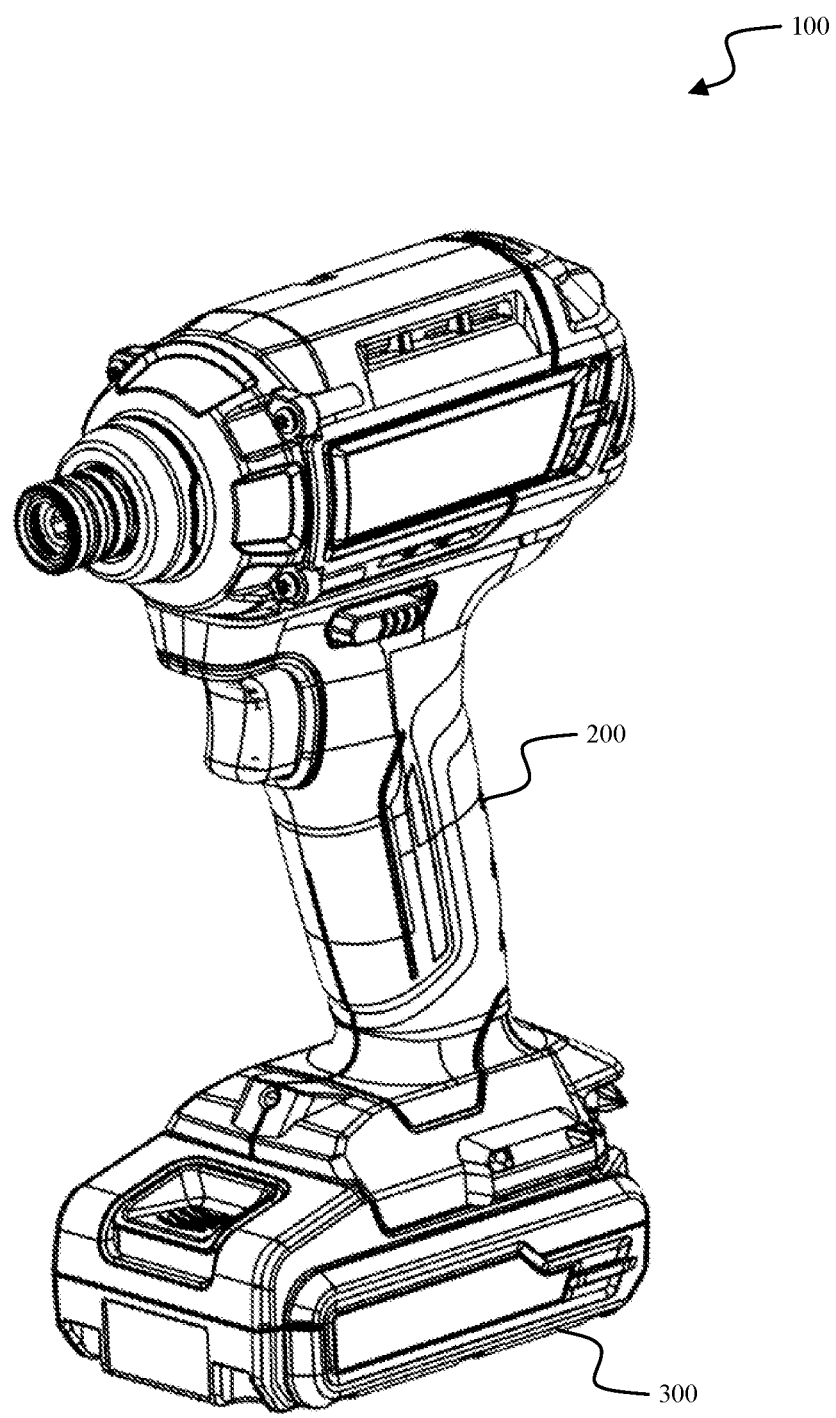
FIG. 1 illustrates an electrical combination of a device and a battery pack for powering the device, according to embodiments described herein.
Figure 2:
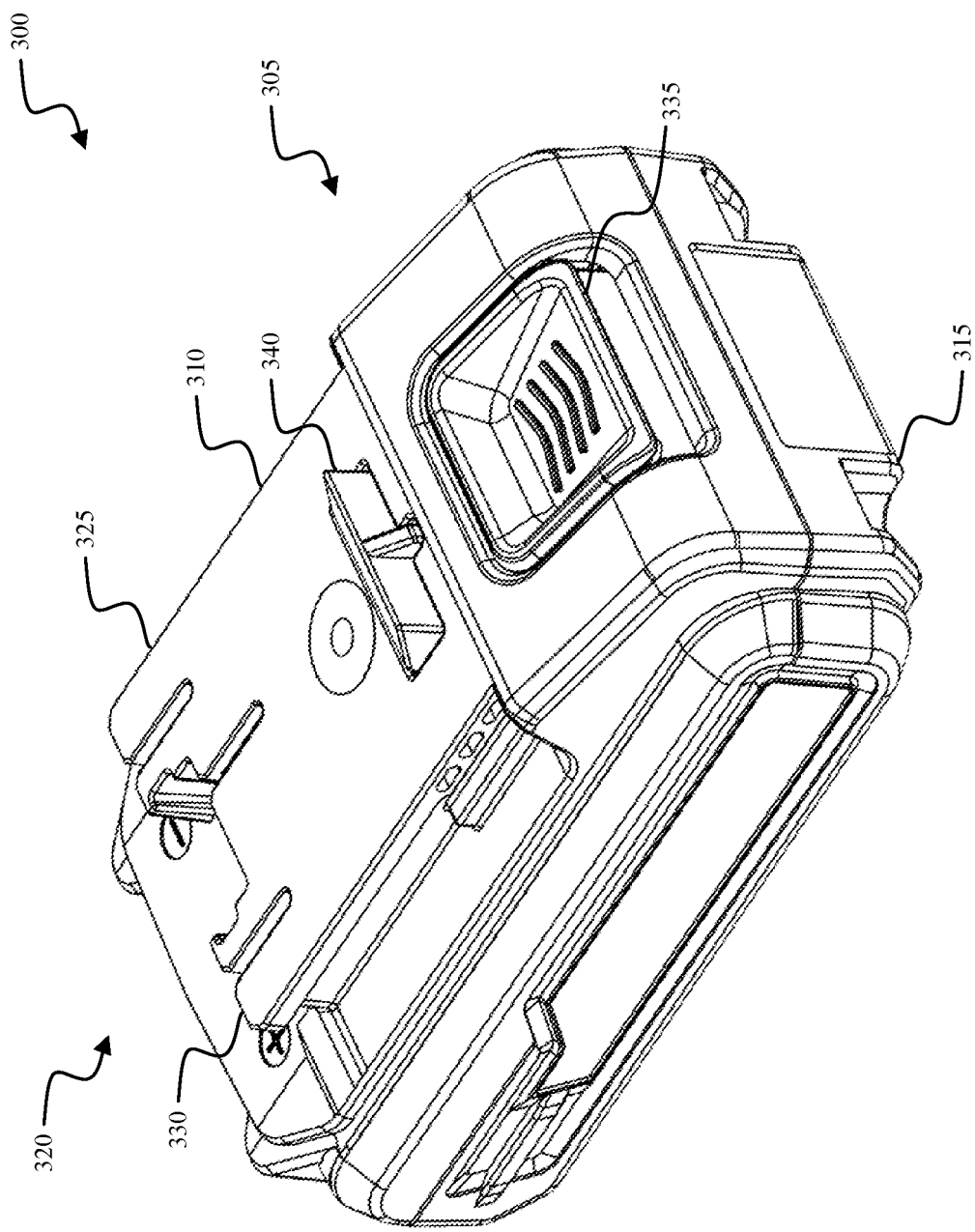
FIG. 2 is a perspective view of a battery pack, according to embodiments described herein.
Figure 3:
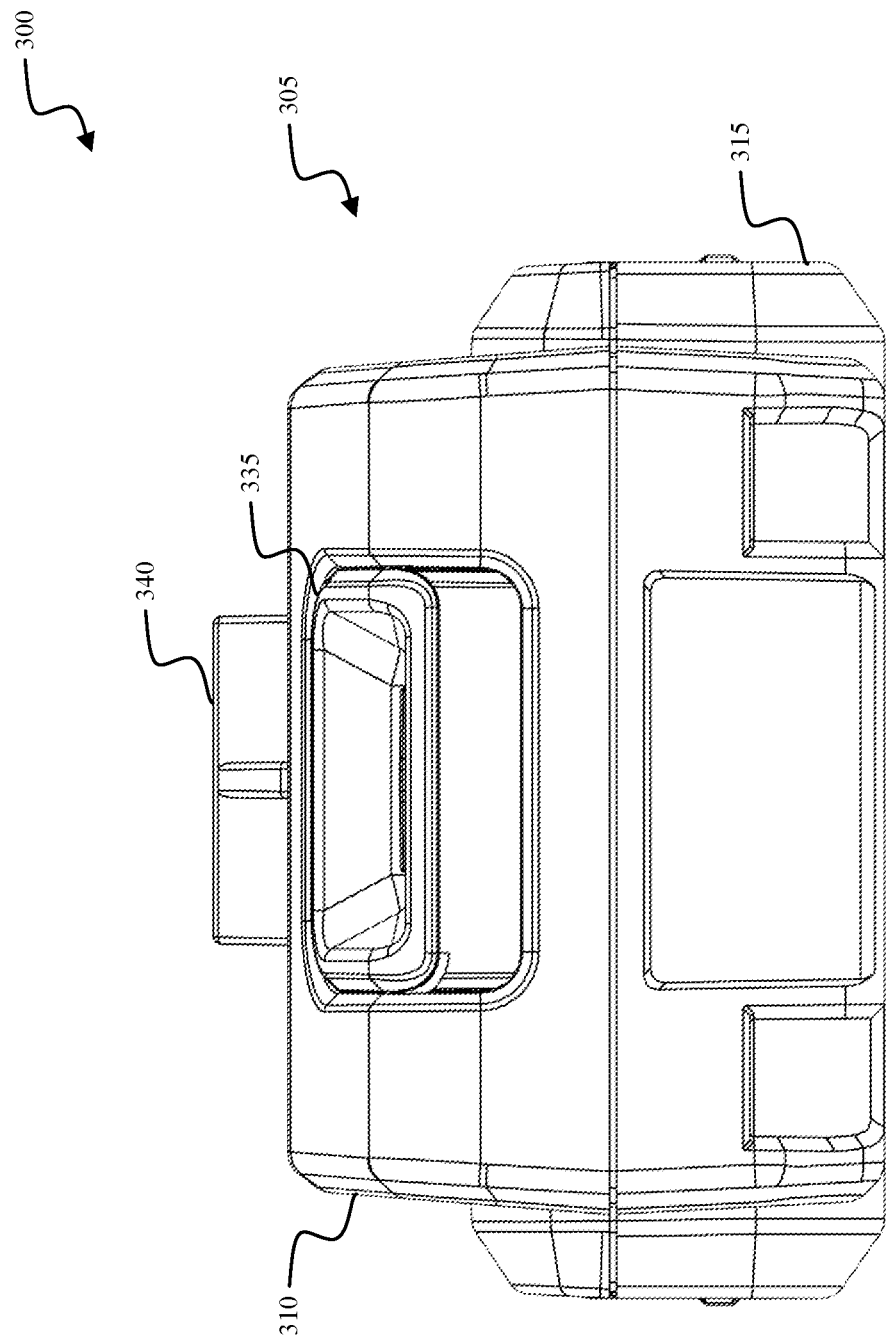
FIG. 3 is a front view of the battery pack of FIG. 2.

FIG. 1 illustrates an electrical combination 100 of a device (e.g., a cordless, hand-held power tool) 200 and a battery pack 300. FIG. 2 illustrates the battery pack 300 that is connectable to and supportable by the cordless, hand-held power tool 200 or another battery pack powered device. For example, the battery pack 300 is configured to be connectable to a screwdriver, a drill driver, an impact driver, an impact wrench, a hammer drill, a jigsaw, a bolt cutter, an offset shear, a planar, a table saw, a miter saw, a grinder, a circular saw, a reciprocating saw, a rotary cutter, a scroll saw, a fan, a caulk gun, a drain auger, a hot glue gun, a transfer pump, a blower, a vacuum cleaner, a propane heater, a cement mixer, a sander, a router, a buffer, a nailer, a staple gun, a light, a speaker, a compressor, an inflator, etc.

As shown in FIGS. 2-8, the battery pack 300 includes a housing 305. The housing 305 includes a top housing portion 310 and a bottom housing portion 315. Although the battery pack 300 is illustrated in FIGS. 2-8 including the top housing portion 310 and the bottom housing portion 315, in some embodiments, the battery pack 300 includes a left housing portion and a right housing portion. The battery pack 300 also includes a support portion 320 for supporting the battery pack 300 on, and coupling the battery pack 300 to, a device such as the hand-held power tool 200. The support portion 320 includes a first rail 325 and a second rail 330 for slidably attaching the battery pack 300 to the device. The support portion 320 is connectable to a complementary support portion on the device (e.g., a battery pack receiving portion of a power tool). The battery pack 300 also includes a button 335 and a latch or coupling mechanism 340 for selectively coupling the battery pack 300 to, or releasing the battery pack 300 from, the device. In some embodiments, the button 335 and coupling mechanism 340 are considered to be included in the battery pack support portion 320.

Figure 4:
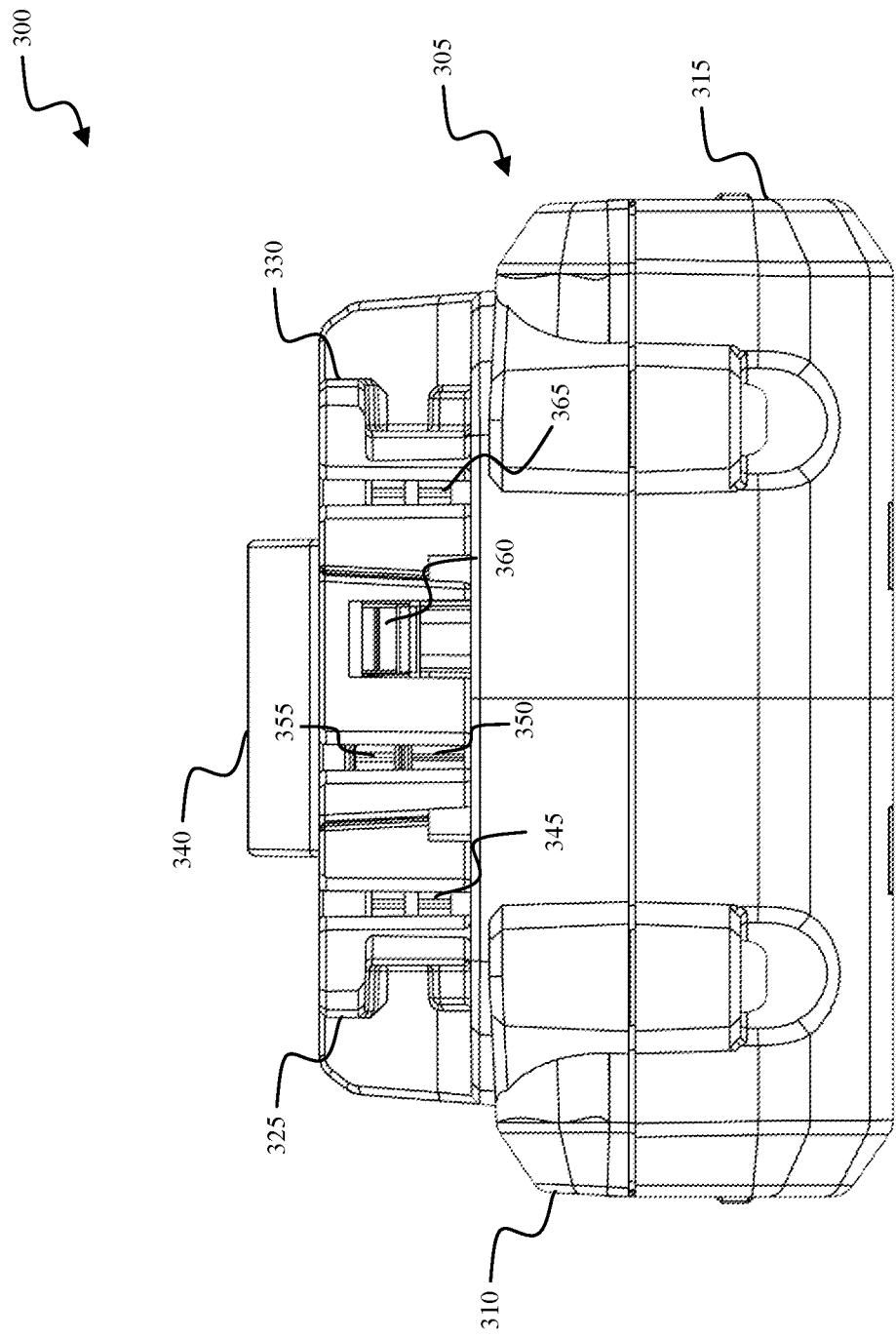
FIG. 4 is a rear view of the battery pack of FIG. 2.
Figure 5:
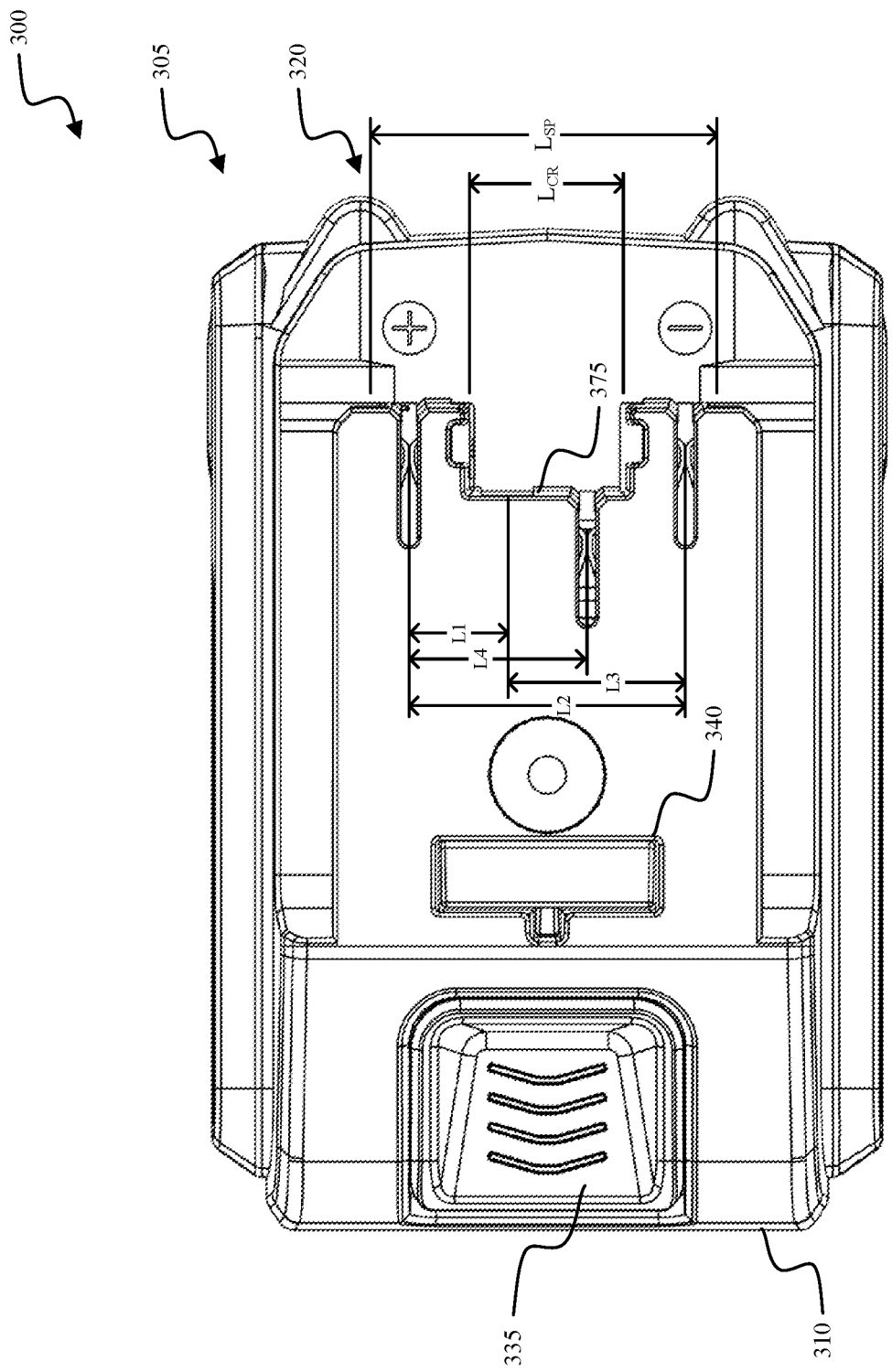
FIG. 5 is a top view of the battery pack of FIG. 2.

The battery pack 300 includes a plurality of terminals within the support portion 320 that are operable to electrically connect one or more battery cells within the battery pack 300 to the device. As illustrated in FIG. 4, the plurality of terminals include a first terminal 345, a second terminal 350, a third terminal 355, a fourth terminal 360, and a fifth terminal 365. In some embodiments, the first terminal 345 is a battery negative terminal, the second terminal 350 is a temperature terminal, the third terminal 355 is a communication terminal, the fourth terminal 360 is a low power or charging terminal, and the fifth terminal 365 is a battery positive terminal. In some embodiments, the second terminal 350 is the communication terminal and the third terminal 355 is a bypass terminal for bypassing a current sensing circuit. Referring to FIGS. 4 and 5, the fifth terminal 365 and the fourth terminal 360 are spaced apart by a lateral separation L1. In some embodiments, the lateral separation L1 is between about 10 mm to about 13 mm (e.g., about 11.2 mm). The first terminal 345 and the fifth terminal 365 are spaced apart by a lateral separation L2. In some embodiments, the lateral separation L2 is between about 30 mm to about 33 mm (e.g., about 31.28 mm). The first terminal 345 and the fourth terminal 360 are spaced apart by a lateral separation L3. In some embodiments, the lateral separation L3 is between about 17 mm to about 33 mm (e.g., about 20.23 mm). The second (or third) terminal 350, 355 and the fifth terminal 365 are spaced apart by a lateral separation L4. In some embodiments, the lateral separation L4 is between about 19 mm to about 22 mm (e.g., about 20.23 mm).

The battery pack 300 is removably and interchangeably connected to a device, such as the hand-held power tool 200, to provide operational power to the device. The terminals 345, 350, 355, 360, and 365 are configured to mate with corresponding terminals extending from the device. The battery pack 300 substantially encloses and covers the terminals on the device when the pack 300 is positioned within a battery pack receiving portion of the device (i.e., the battery pack 300 functions as a cover for the opening and terminals of the device). Once the battery pack 300 is disconnected from the device, the terminals on the device are generally exposed to the surrounding environment. In this illustrated embodiment, the battery pack 300 is designed to substantially follow the contours of a hand-held power tool to match the general shape of an outer casing of a handle of the power tool 200, and the battery pack 300 generally increases (i.e., extends) the length of the grip of the power tool (e.g., a portion of the power tool below a motor).

Figure 6:
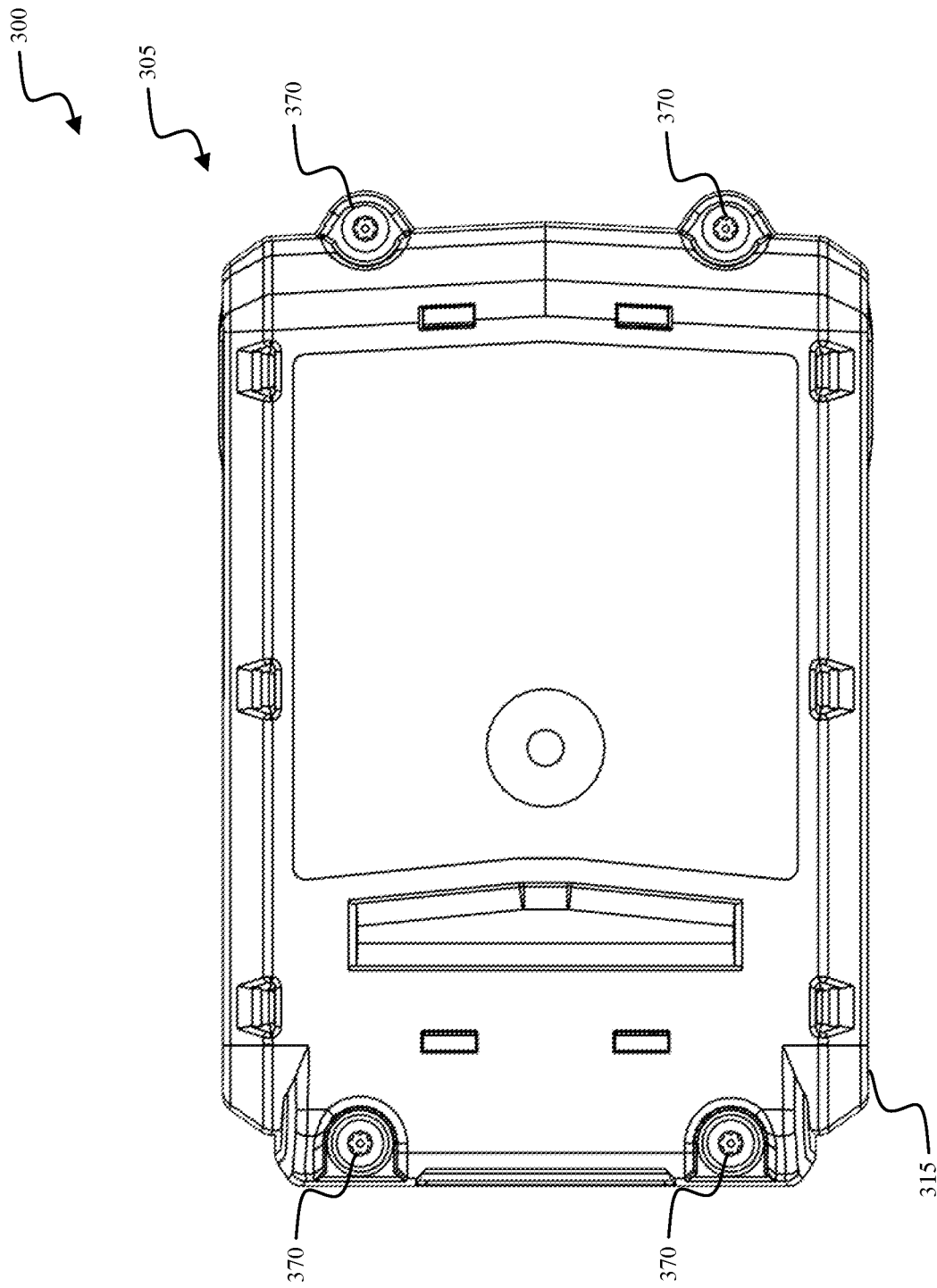
FIG. 6 is a bottom view of the battery pack of FIG. 2.
Figure 7:
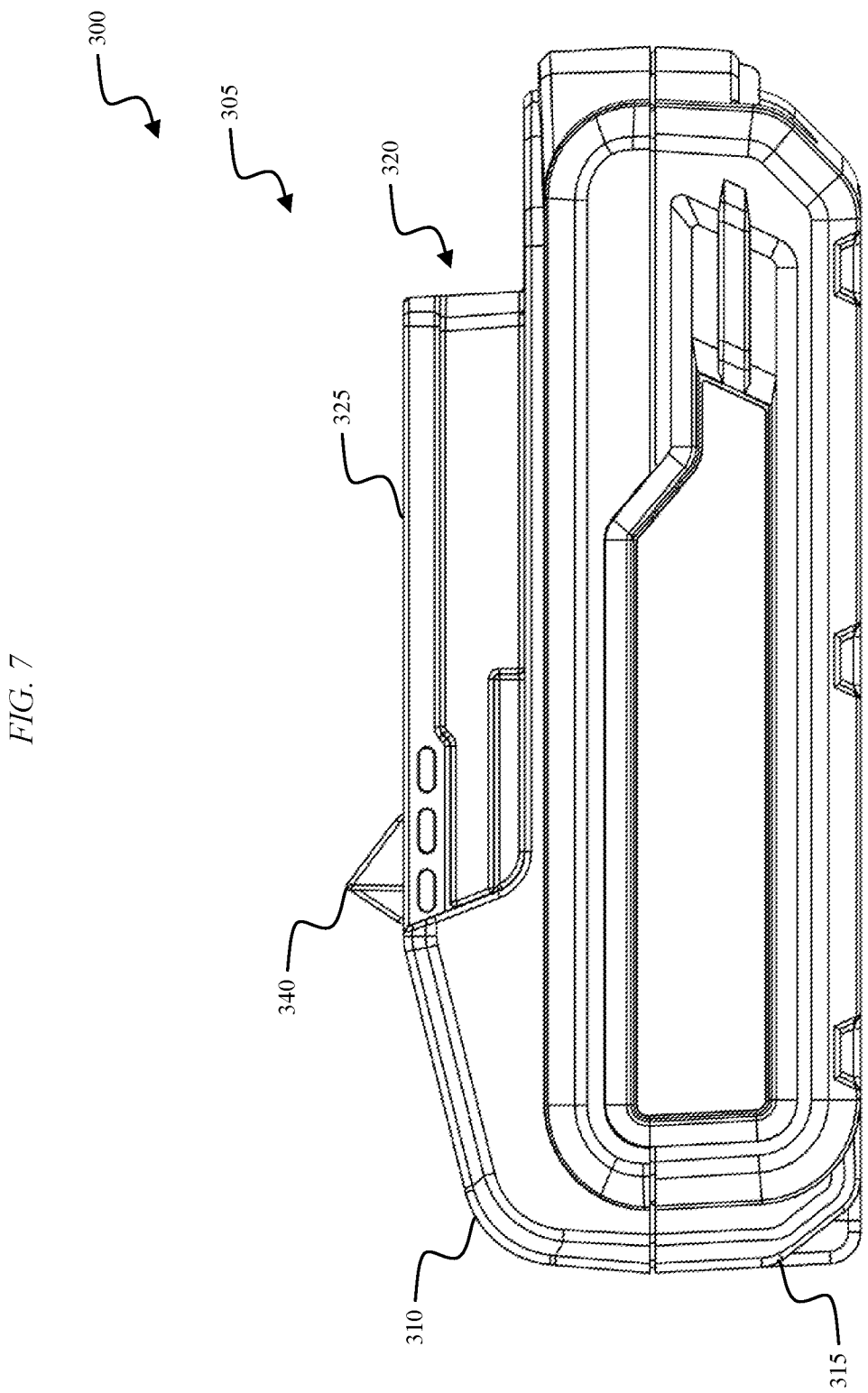
FIG. 7 is a right-side view of the battery pack of FIG. 2.
Figure 8:
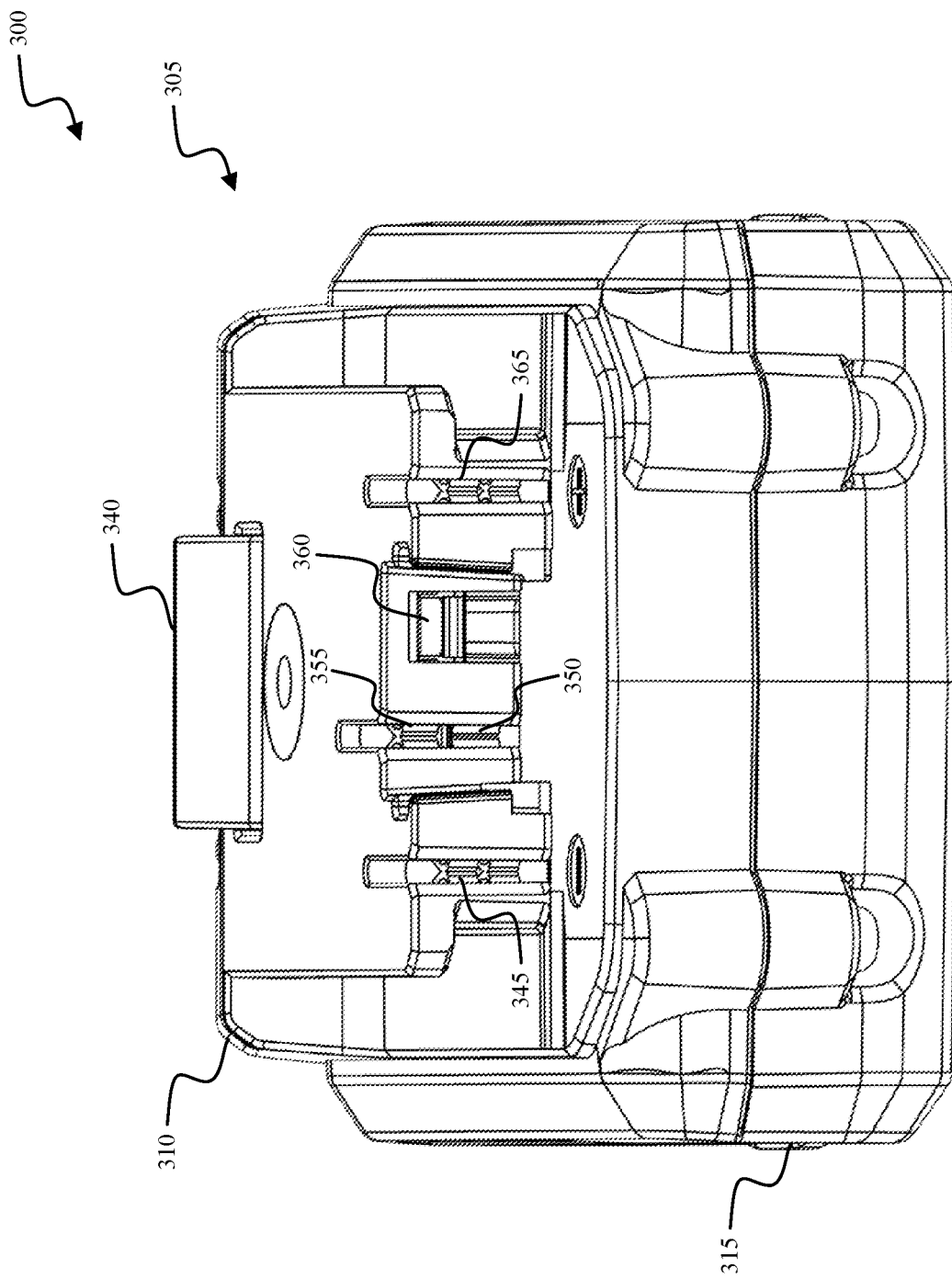
FIG. 8 is a rear-perspective view of the battery pack of FIG. 2.

As illustrated in FIG. 6, the bottom housing portion 315 of the housing 305 includes four fasteners 370 for fastening the bottom housing portion 315 to the top housing portion 310. For example, in some embodiments, the fasteners 370 are screws that extend vertically through apertures in the bottom housing portion 315 to engage a threaded aperture in the top housing portion 310. In other embodiments, the top housing portion 310 and the bottom housing portion 315 are fastened together in a different manner, such as using an adhesive or a fastener other than a screw.

With reference to FIG. 5, the support portion 320 is configured to accommodate device interfaces for a variety of different devices. For example, the device interfaces can vary based on which terminals (e.g., male terminals) are used to connect to the battery pack 300's terminals (e.g., female terminals). The interfaces can also vary in size. For example, the support portion 320 has a support portion length, $L_{SP}$. A central recess 375 within the support portion 320 has a central recess length, $L_{CR}$. In some embodiments, the central recess length, $L_{CR}$, is between about 17 mm to about 20 mm (e.g., about 18.75 mm). In some embodiments, a device interface is approximately the same size as the support portion length, $L_{SP}$. In some embodiments, the support portion length, $L_{SP}$, is between about 43 mm to about 46 mm (e.g., about 44.48 mm). In other embodiments, a device interface is approximately the same size as the central recess length, $L_{CR}$. Accordingly, the battery pack 300 is configured to accommodate device interfaces of different sizes.

Figure 9:
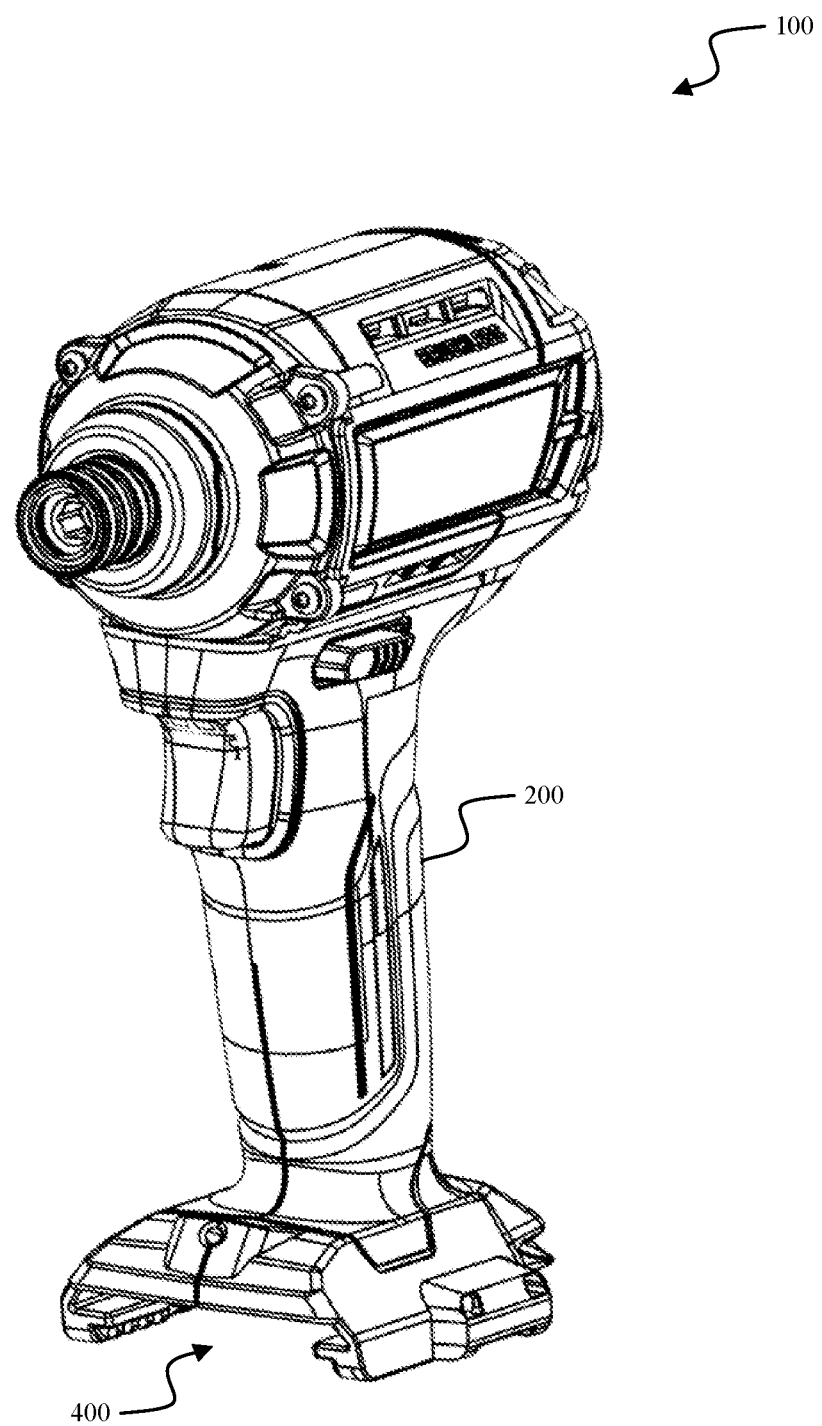
FIG. 9 is a perspective view of a device that is configured to be powered by the battery pack of FIG. 2, according to embodiments described herein.
Figure 10:
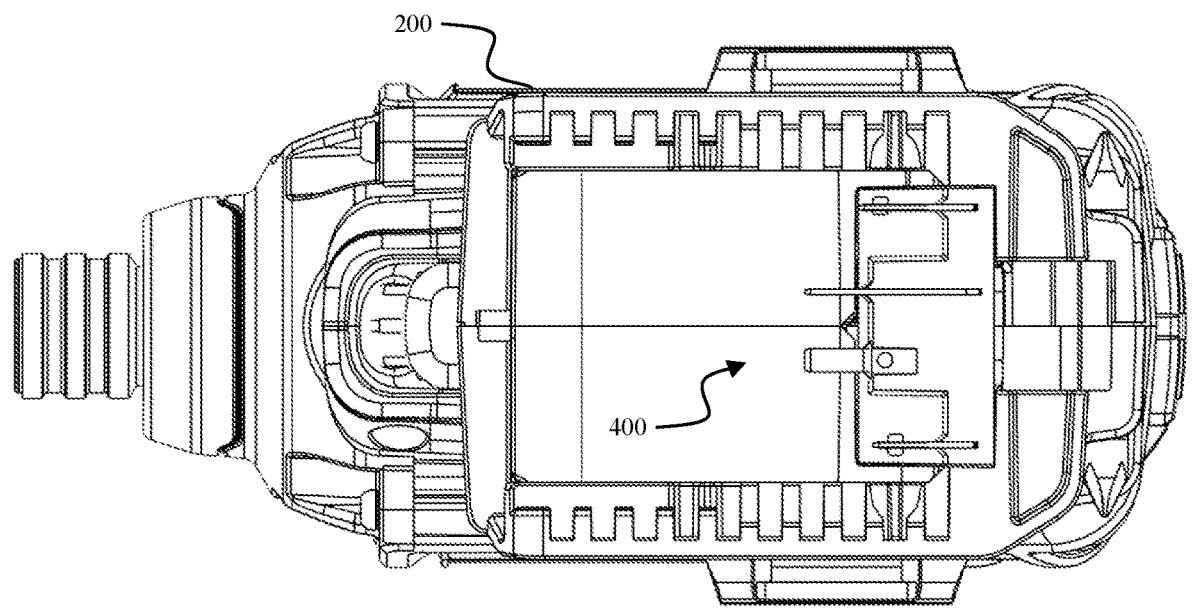
FIG. 10 is a bottom view of the device of FIG. 9.

FIGS. 9 and 10 illustrate the electrical combination 100 with the battery pack 300 removed (i.e., detached) from the device 200. The device 200 includes an interface 400 for electrically connecting to the battery pack 300. The interface 400 is illustrated in greater detail in FIGS. 11 and 12. The interface 400 includes an interface body 405, a first terminal 410, a second terminal 415, a third terminal 420, a fourth terminal 425, and a fifth terminal 430. The interface body 405 has an interface body length, $L_{IB}$. A central portion of the interface body 405 has a central portion length, $L_{CP}$. The interface body length, $L_{IB}$, is approximately equal to the support portion length, $L_{SP}$, of the battery pack 300. The central portion length, $L_{CP}$, is approximately equal to the central recess length, $L_{CR}$, of the battery pack 300. Although the interface 400 is illustrated as including five terminals, in other embodiments, an interface for electrically connecting to the battery pack 300 includes fewer than five terminals (e.g., two terminals, three terminals, or four terminals). Each of the terminals 410-430 can be configured to provide a particular connection between the device 200 and the battery pack 300. As a result, each of the terminals 410-430 provides a dedicated function to the device 200 based on the type of device 200 that is being connected to the battery pack. For example, when the device 200 is a battery pack charger, the same terminal connections do not need to be used as when the device 200 is a cordless, hand-held power tool (e.g., a drill). As such, the five terminal embodiment illustrated in FIGS. 11 and 12 is shown for illustrative purposes and an interface for electrically connecting to the battery pack can include all or a subset of the five illustrated terminals 410-430.

Figure 11:
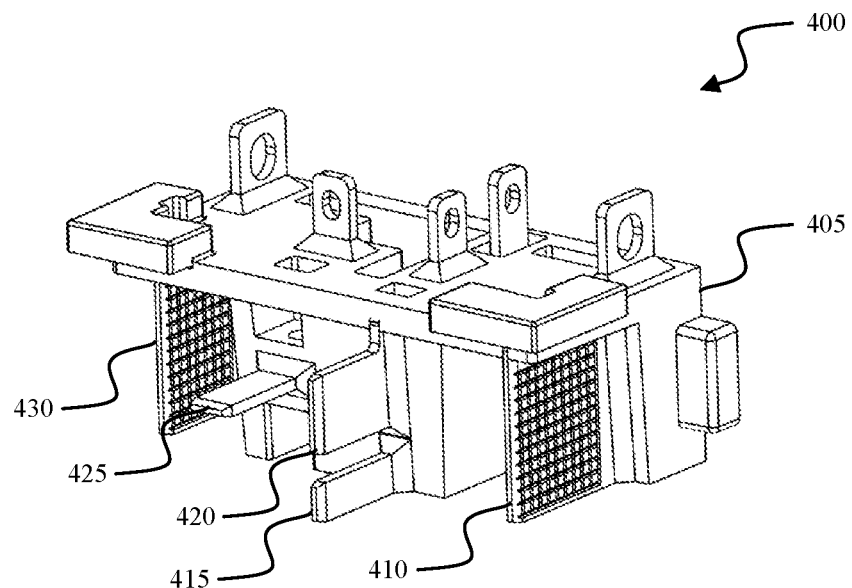
FIGS. 11 and 12 illustrate a device interface for connecting the device of FIG. 10 to the battery pack of FIG. 2, according to embodiments described herein.
Figure 12:
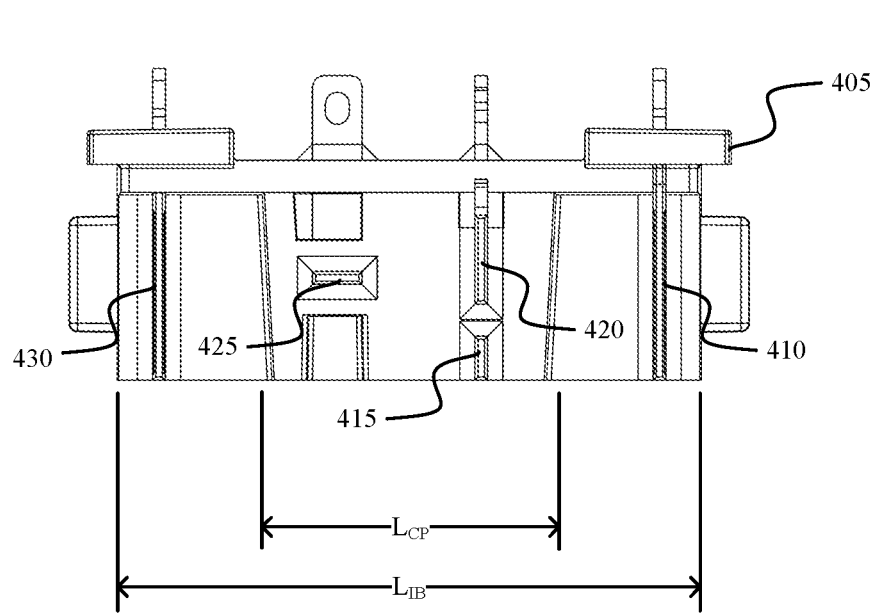

For the interface 400 shown in FIGS. 11 and 12, the first terminal 410 is a battery pack negative power terminal, the second terminal 415 is a temperature terminal, the third terminal 420 is a communication terminal, the fourth terminal 425 is a charging terminal, and the fifth terminal 430 is a battery pack positive power terminal. In some embodiments, the fourth terminal 425 is also configured to operate as a low-power terminal. The fourth terminal 425 can be configured to provide charging current to the battery pack 300 when the device 200 is a battery pack charger. The fourth terminal 425 can be configured to receive power from the battery pack 300 when the device 200 is a low power device (e.g., a device requiring a comparatively low discharge current from the battery pack 300), such as a light, a fan, etc. In some embodiments, the second terminal 415 is configured as the communication terminal and the third terminal 420 is configured as a bypass terminal. In such embodiments, the bypass terminal 420 is configured to bypass, for example, a current sensing circuit. As a result, current sensing circuitry within the battery pack 300 can be avoided by the device 200 if the device 200 is configured to use the bypass terminal 420 instead of the battery pack negative power terminal 410.

When the third terminal 420 is configured as a bypass terminal, it is used, for example, by high current draw devices to prevent the battery pack 300 from unnecessarily shutting down the battery pack 300 due to high current, or from adding resistance (e.g., a current sensing resistor) to the battery pack 300's discharge circuit, which can limit the output current capability of the battery pack 300. In some embodiments, the interface 400 includes each of terminals 410-430, but one or more of the terminals 410-430 are non-functional or non-operational. For example, by including all of the terminals 410-430 in the interface 430, a more secure connection between the battery pack 300 and the device 200 can be achieved. In some embodiments, one or more of the terminals 410-430 in the interface 400 are not present, but the general shape of the interface body 405 remains substantially the same. As a result, the shape of the interface body helps to securely connect the interface 400 to the battery pack 300 in the absence of one or more of the terminals 410-430.

Figure 13:
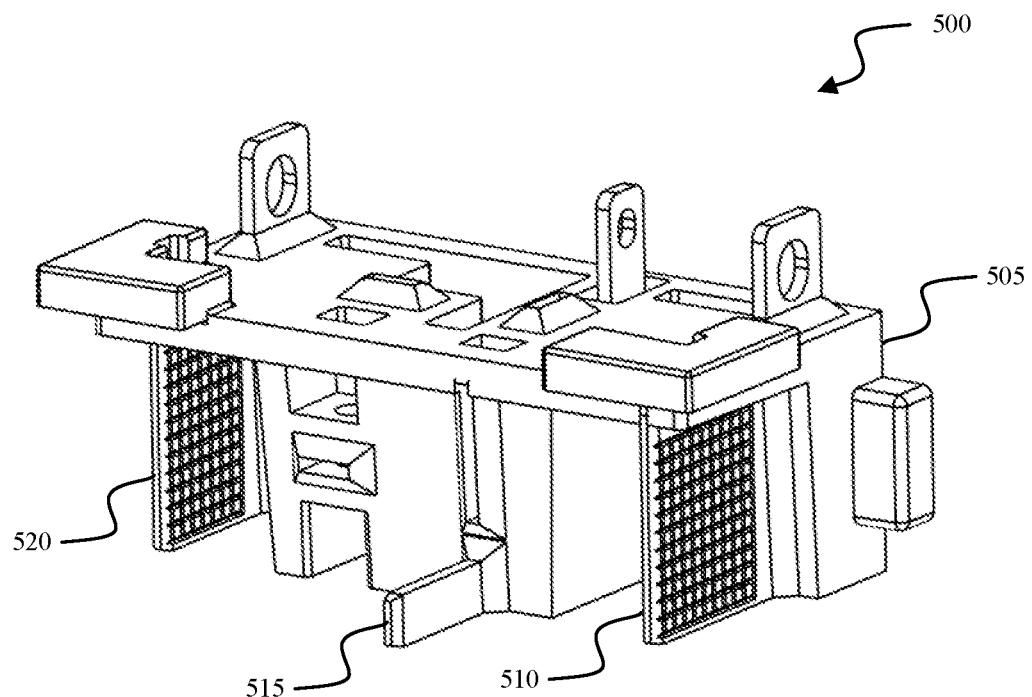
FIGS. 13 and 14 illustrate another device interface for connecting the device of FIG. 10 to the battery pack of FIG. 2, according to embodiments described herein.
Figure 14:
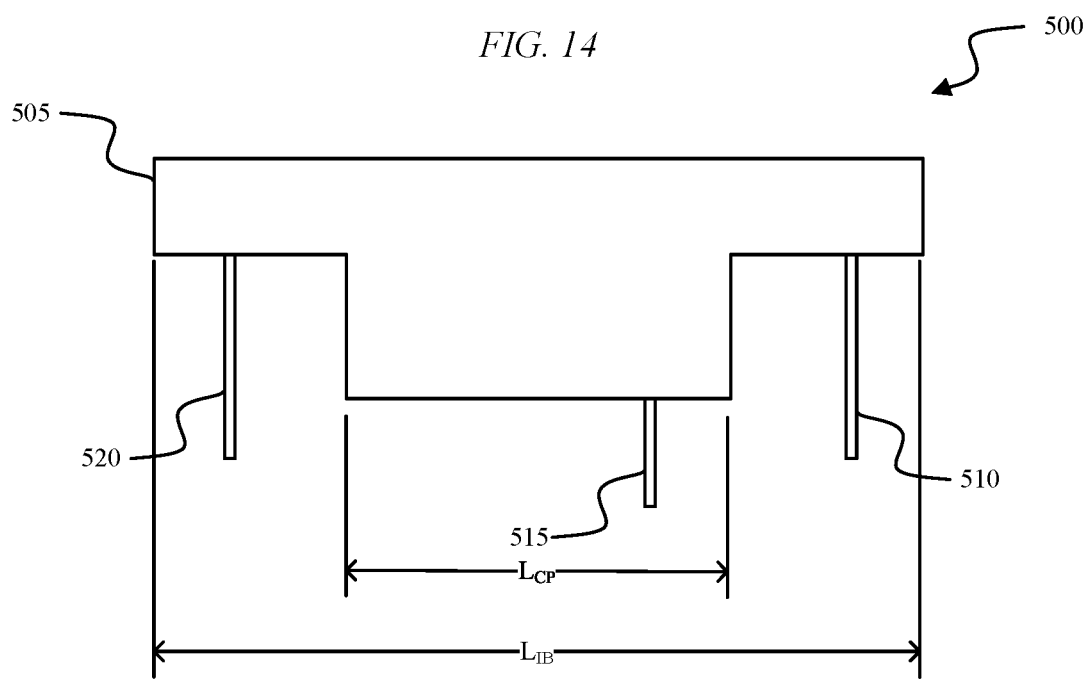

FIGS. 13 and 14 illustrate an interface 500 that includes an interface body 505, a first terminal 510, a second terminal 515, and a third terminal 520. The interface body 505 has an interface body length, $L_{IB}$. A central portion of the interface body 505 has a central portion length, $L_{CP}$. The interface body length, $L_{IB}$, is approximately equal to the support portion length, $L_{SP}$, of the battery pack 300. The central portion length, $L_{CP}$, is approximately equal to the central recess length, $L_{CR}$, of the battery pack 300. For the interface 500 shown in FIGS. 13 and 14, the first terminal 510 is a battery pack negative power terminal, the second terminal 515 is a communication terminal, and the third terminal 520 is a battery pack positive power terminal. The interface body 505 of the interface 500 is substantially the same shape as the interface body 405 for the interface 400. As described previously, the shape of the interface body helps to securely connect the interface 500 to the battery pack 300 in the absence of one or more terminals.

Figure 15:
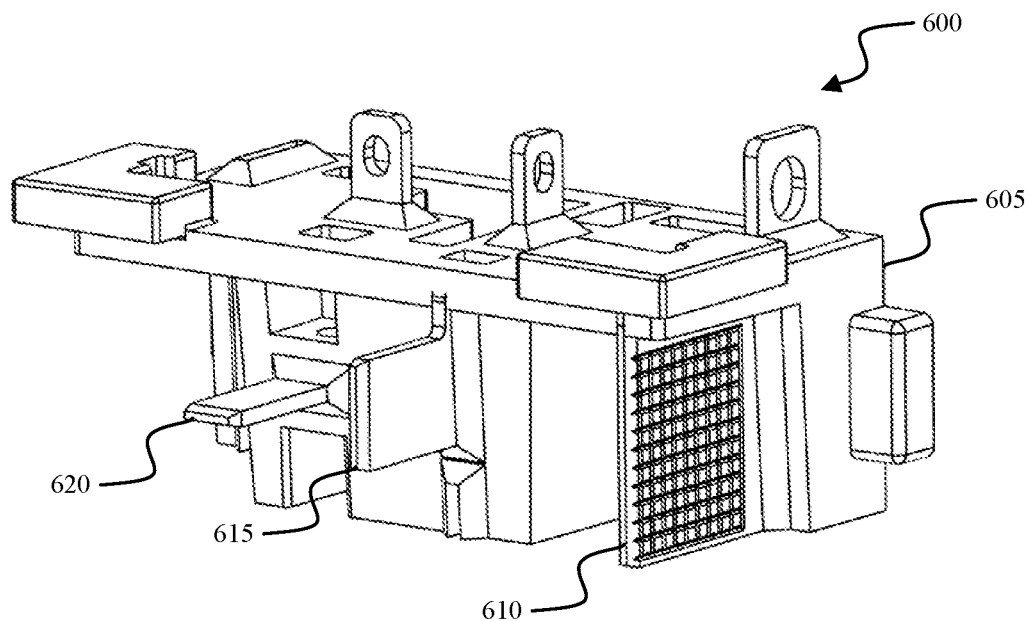
FIGS. 15 and 16 illustrate another device interface for connecting the device of FIG. 10 to the battery pack of FIG. 2, according to embodiments described herein.
Figure 16:
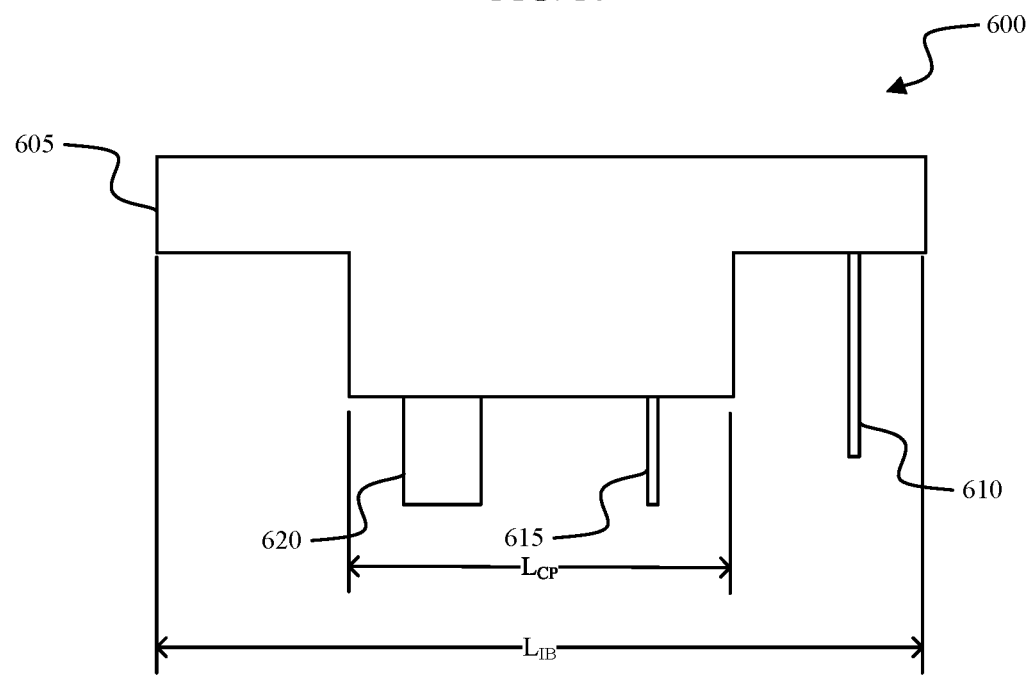

FIGS. 15 and 16 illustrate an interface 600 that includes an interface body 605, a first terminal 610, a second terminal 615, and a third terminal 620. The interface body 605 has an interface body length, $L_{IB}$. A central portion of the interface body 605 has a central portion length, $L_{CP}$. The interface body length, $L_{IB}$, is approximately equal to the support portion length, $L_{SP}$, of the battery pack 300. The central portion length, $L_{CP}$, is approximately equal to the central recess length, $L_{CR}$, of the battery pack 300. For the interface 600 shown in FIGS. 15 and 16, the first terminal 610 is a battery pack negative power terminal, the second terminal 615 is a communication terminal, and the third terminal 620 is a battery pack positive power terminal. The interface body 605 of the interface 600 is substantially the same shape as the interface body 405 and 505 for the interfaces 400 and 500, respectively. As described previously, the shape of the interface body helps to securely connect the interface 600 to the battery pack 300 in the absence of one or more terminals. In some embodiments, the interface 600 shown in FIGS. 15 and 16 corresponds to an charger interface for charging the battery pack 300. In other embodiments, the interface 600 shown in FIGS. 15 and 16 corresponds to a low power device 200 that includes communication capability (i.e., through the communication terminal 615).

Figure 17:
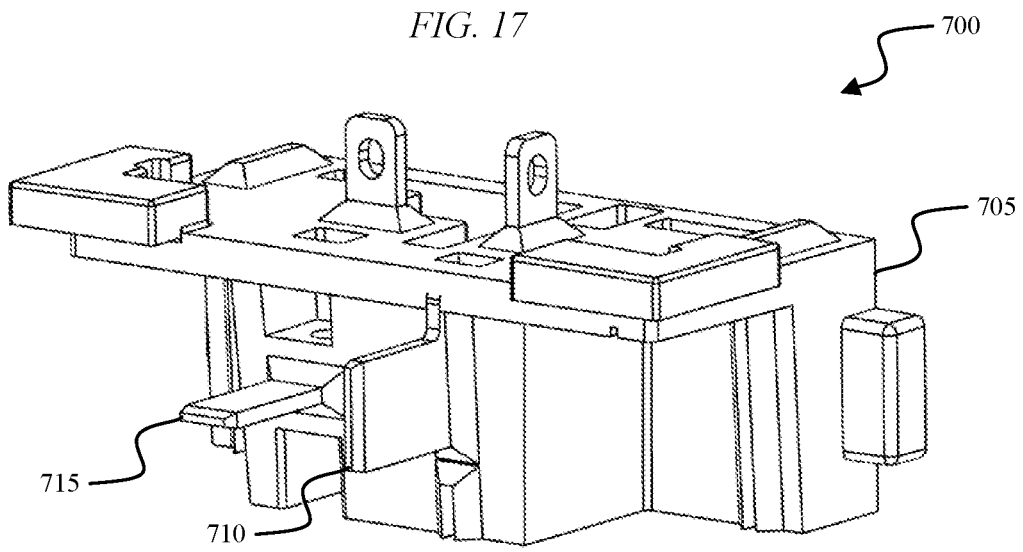
FIGS. 17 and 18 illustrate another device interface for connecting the device of FIG. 10 to the battery pack of FIG. 2, according to embodiments described herein.
Figure 18:
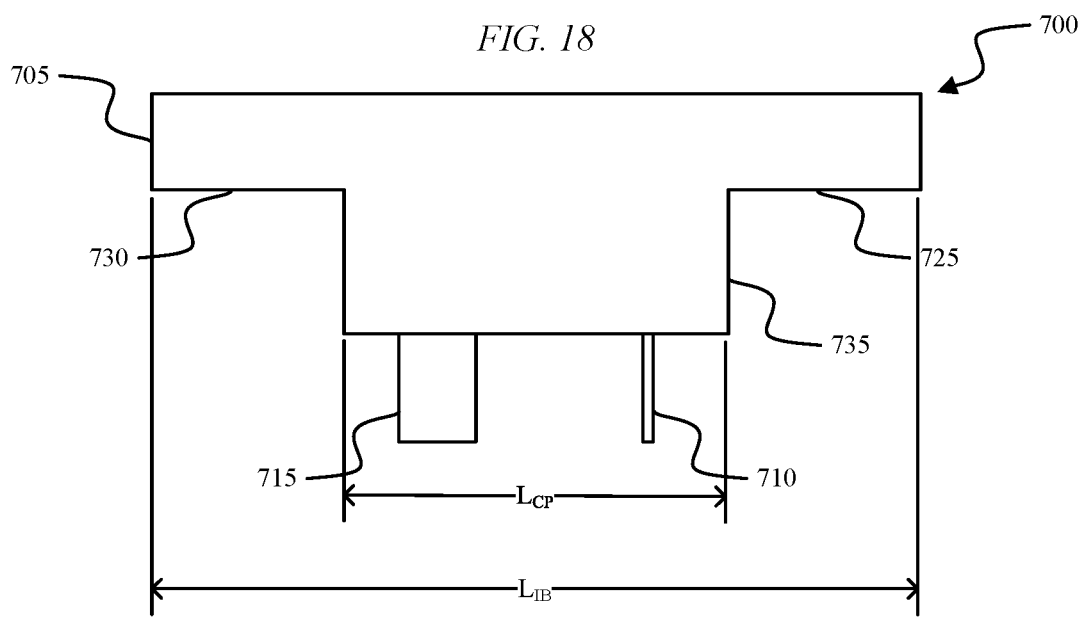

FIGS. 17 and 18 illustrate an interface 700 that includes an interface body 705, a first terminal 710 and a second terminal 715. The interface body 705 has an interface body length, $L_{IB}$. A central portion of the interface body 705 has a central portion length, $L_{CP}$. The interface body length, $L_{IB}$, is approximately equal to the support portion length, $L_{SP}$, of the battery pack 300. The central portion length, $L_{CP}$, is approximately equal to the central recess length, $L_{CR}$, of the battery pack 300. For the interface 700 shown in FIGS. 17 and 18, the first terminal 710 is a battery pack negative power terminal, and the second terminal 715 is a battery pack positive power terminal. The interface body 705 of the interface 700 is substantially the same shape as the interface bodies 405, 505, and 605 for the interfaces 400, 500, and 600, respectively. As described previously, the shape of the interface body helps to securely connect the interface 700 to the battery pack 300 in the absence of one or more terminals. In some embodiments, the interface 700 shown in FIGS. 17 and 18 corresponds to a low power device 200 (e.g., a lamp, a fan, etc.) that requires only low discharge currents from the battery pack 300 and does not require communication capability.

Figure 19:
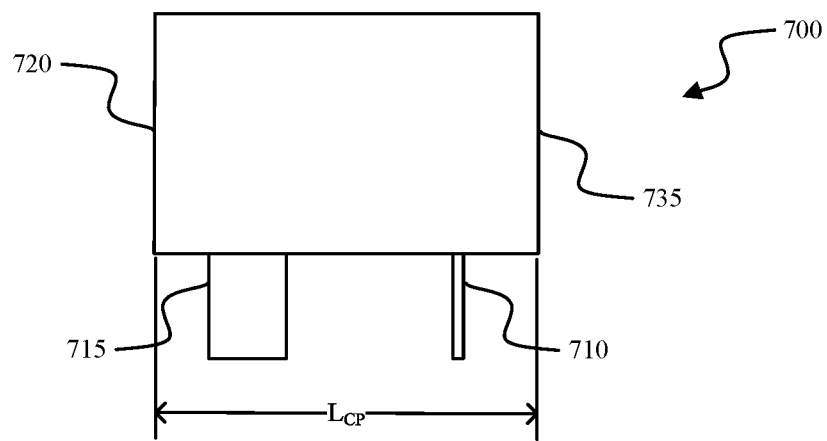
FIG. 19 illustrates another device interface for connecting the device of FIG. 10 to the battery pack of FIG. 2, according to embodiments described herein.

FIG. 19 illustrates a modified interface body 720 for the interface 700. The shape of the modified interface body 720 is different from the shape of the interface body 705. For example, the interface body 705 (and interface bodies 405, 505, and 605) include a first lateral portion 725, a second lateral portion 730, and a central portion 735. The length of the interface body 705 including the portions 725, 730, and 735 is the interface body length, $L_{IB}$, and is approximately the same length as the support portion length, $L_{SP}$, of the battery pack 300. Because the interface 700 of FIGS. 17 and 18 includes only the first terminal 710 and the second terminal 715, the lateral portions 725, 730 are not being used to support any terminals. As a result, the lateral portions 725, 730 of the interface body 705 can be removed. The result of removing the lateral portions 725, 730 from the interface body 705 is the modified interface body 720, which includes only the central portion 735 having the central portion length, $L_{CP}$. The central portion length, $L_{CP}$, is approximately the same length as the central recess length, $L_{CR}$, of the battery pack 300 (see FIG. 5), such that the central recess 375 is configured to receive the central portion 735 of the interface 700. Accordingly, the battery pack 300 is configured to receive or accommodate device interfaces of different sizes, different shapes, and having different terminal configurations.

Figure 20:
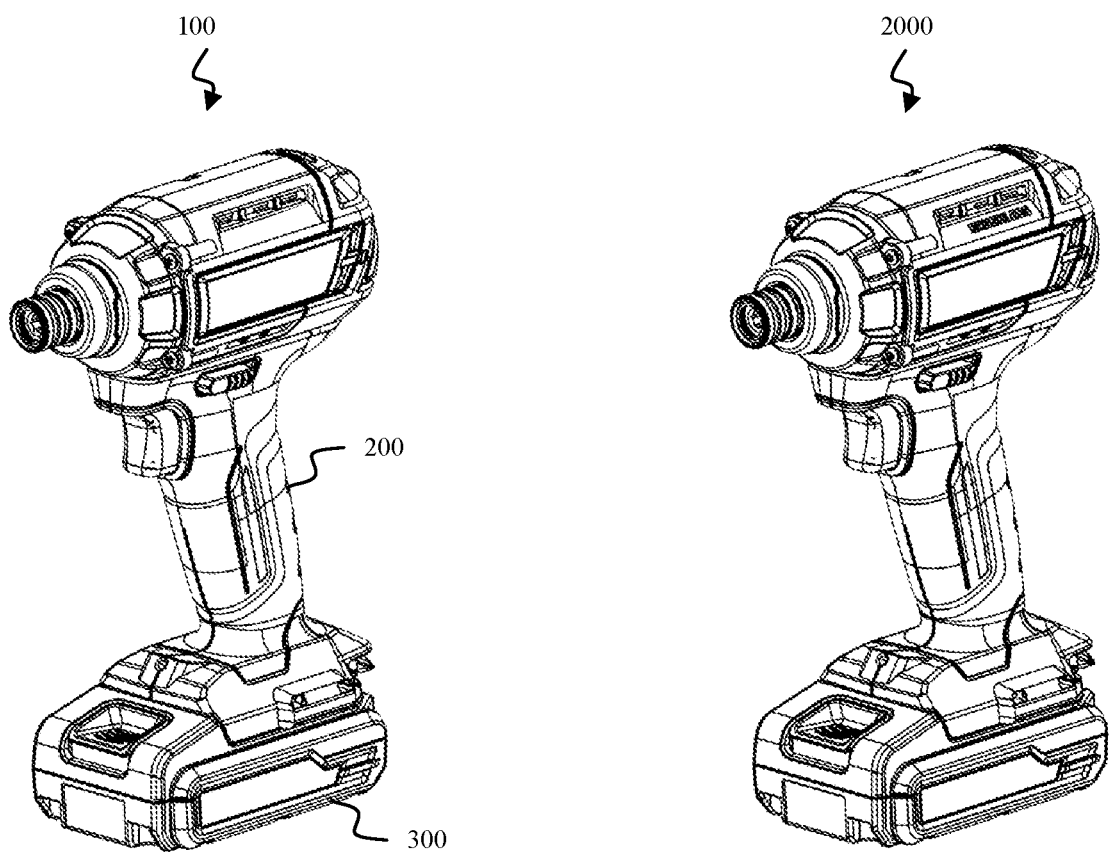
FIG. 20 illustrates a first battery pack powered device and a second battery pack powered device, according to embodiments described herein.

FIG. 20 illustrates a system of battery pack powered devices, the system comprising a first battery pack powered device 200 including a first electrical interface, a second battery pack powered device 2000 including a second electrical interface, a battery pack configured to electrically connect to the first battery pack powered device 200 through the first electrical interface and the second battery pack powered device 2000 through the second electrical interface, the battery pack including, a housing including a battery pack support portion configured to removably mechanically connect the battery pack to the first device and the second device, the battery pack support portion having a support portion length, the battery pack support portion including a first rail, a second rail, and a coupling mechanism for securing the battery pack to the first device and the second device, and a central recess having a central recess length, a plurality of battery cells located within the housing, a first battery pack terminal configured to electrically connect the battery pack to the first electrical interface of the first device, and a second battery pack terminal configured to electrically connect the battery pack to the second electrical interface of the second device, the second battery pack terminal accessible through the central recess of the battery pack support portion, wherein the second battery pack terminal does not electrically connect to the first electrical interface of the first battery pack powered device 200, and wherein the first battery pack terminal does not electrically connect to the second electrical interface of the second battery pack powered device 2000.

Thus, embodiments described herein provide, among other things, a battery pack that is configured to accommodate multiple different device interfaces. Various features and advantages are set forth in the following claims.

What is claimed is:

1. A system of battery pack powered devices, the system comprising:
    a first device including a first electrical interface;
    a second device including a second electrical interface;
    a battery pack including a battery pack support portion and an interface body, the interface body having a first removable lateral portion and a second removable lateral portion;
    a first removable battery pack interface configured to electrically and mechanically connect to the battery pack support portion, the first removable battery pack interface further configured to electrically connect to the first electrical interface of the first device; and
    a second removable battery pack interface configured to electrically and mechanically connect to the battery pack support portion, the second removable battery pack interface further configured to electrically connect to the second electrical interface of the second device,
    wherein the interface body is configured to be operable in a first terminal configuration and a second terminal configuration.

2. The system of claim 1,
    wherein the first terminal configuration requires the first removable lateral portion and the second removable lateral portion, and
    wherein the second terminal configuration does not require the first removable lateral portion and the second removable lateral portion.

3. The system of claim 1, wherein the first removable battery pack interface further includes a first plurality of terminals,
    wherein the second removable battery pack interface further includes a second plurality of terminals, and
    wherein the first plurality of terminals includes a greater number of terminals than the second plurality of terminals.

4. The system of claim 1, wherein the first removable battery pack interface includes an interface body length that is approximately equal to a battery pack support portion length.

5. The system of claim 1, the battery pack support portion further including a central recess, the central recess including a central recess length,
    wherein the first removable battery pack interface includes a central portion including a central portion length, and
    wherein the central portion length is approximately equal to the central recess length.

6. The system of claim 1, wherein the first device is a battery charger.

7. The system of claim 1, wherein the second device is a low power device that includes communication capability.

8. The system of claim 1, wherein the second device is a low power device that does not include communication capability.

9. The system of claim 3, wherein a shape of a body portion of the first removable battery pack interface and a shape of a body portion of the second removable battery pack interface are approximately equal in shape.

10. The system of claim 4, wherein the battery pack support portion length is between approximately 43 mm and approximately 46 mm.

11. The system of claim 4, wherein the battery pack support portion length is 44.48 mm.

12. The system of claim 5, wherein the central recess length is between approximately 17 mm and 20 mm.

13. The system of claim 5, wherein the central recess length is 18.75 mm.

14. A system of battery pack powered devices, the system comprising:
    a first device including a first electrical interface;
    a second device including a second electrical interface;
    a battery pack including a battery pack support portion;
    a removable battery pack interface configured to electrically and mechanically connect to the battery pack support portion, the removable battery pack interface comprising:
        a first terminal configured to electrically connect the battery pack to the first electrical interface of the first device;
        a second terminal configured to electrically connect the battery pack to the second electrical interface of the second device; and
        a third terminal configured as a bypass terminal configured to bypass a current sensing circuit;
    wherein, in response to connecting the removable battery pack interface to the first electrical interface, the removable battery pack interface is configured to electrically connect the first terminal to the first electrical interface and not connect the second terminal to the first device; and
    wherein, in response to connecting the removable battery pack interface to the second electrical interface, the removable battery pack interface is configured to electrically connect the second terminal to the second electrical interface and not connect the first terminal.

15. The system of claim 14, wherein the removable battery pack interface further includes a first configuration of a plurality of terminals and a second configuration of the plurality of terminals, and wherein the first configuration of the plurality of terminals includes a greater number of terminals than the second configuration of the plurality of terminals.

16. The system of claim 14, the battery pack support portion further including a central recess, the central recess including a central recess length,
wherein the removable battery pack interface includes a central portion including a central portion length, and wherein the central portion length and the central portion length are both between approximately 17 mm and 20 mm.

17. The system of claim 14, wherein a shape of a body portion of the removable battery pack interface and a shape of a body portion of the battery pack support portion are approximately equal in shape.

18. The system of claim 17, wherein the shape body portion of the removable battery pack interface is configured to mechanically secure the removable battery pack interface to the battery pack support portion in an absence of any of the first terminal, the second terminal, or the third terminal.

19. An interface configured to electrically and mechanically connect to a battery pack, the interface comprising:
a first terminal configured to electrically connect the battery pack to a first electrical interface of a first device;
a second terminal configured to electrically connect the battery pack to a second electrical interface of a second device; and
a third terminal configured as a bypass terminal configured to bypass a current sensing circuit;
wherein in response to mechanically connecting to the first device, electrically connecting the first terminal and the third terminal of the interface to the battery pack, and
wherein in response to mechanically connecting to the second device, electrically connecting the second terminal and the third terminal of the interface to the battery pack.

20. The interface of claim 19, the interface further comprising:
a fourth terminal configured to electrically connect the battery pack to the first electrical interface of the first device and to the second electrical interface of the second device,
wherein the fourth terminal includes an electric polarity that is opposite than an electric polarity of the first terminal,
wherein response to mechanically connecting to the first device, electrically connecting the first terminal and the third terminal and the fourth terminal of the interface to the battery pack, and wherein response to mechanically connecting to the second device, electrically connecting the second terminal and the third terminal and the fourth terminal of the interface to the battery pack.

* * * * *